(12) United States Patent
Quaife

(10) Patent No.: US 6,634,979 B1
(45) Date of Patent: Oct. 21, 2003

(54) GEAR SYSTEM WITH ADJUSTABLE RESISTANCE TO DIFFERENTIAL ACTION

(75) Inventor: Michael John Quaife, Underiver Farm, Sevenoaks, Kent (GB)

(73) Assignees: Michael John Quaife, Kent (GB); Sharon Quaife-Hobbs, Kent (GB)

( * ) Notice: Subject to any disclaimer, the term of this patent is extended or adjusted under 35 U.S.C. 154(b) by 0 days.

(21) Appl. No.: 09/703,262

(22) Filed: Oct. 31, 2000

(51) Int. Cl.$^7$ ................................................ F16H 48/22
(52) U.S. Cl. ........................................ 475/249; 475/252
(58) Field of Search ................ 475/248, 249, 475/252, 226

(56) References Cited

U.S. PATENT DOCUMENTS

| | | | |
|---|---|---|---|
| 3,375,736 A | | 4/1968 | Saari |
| 4,916,978 A | | 4/1990 | Razelli et al. |
| 5,055,016 A | | 10/1991 | Kawade |
| 5,081,385 A | * | 1/1992 | Gajjar ........................ 192/56.1 |
| 5,147,252 A | | 9/1992 | Mace et al. |
| 5,169,370 A | * | 12/1992 | Dye et al. .................... 475/226 |
| 5,232,416 A | * | 8/1993 | Amborn et al. ............. 475/248 |
| 5,366,422 A | | 11/1994 | Dye et al. |
| 5,529,547 A | * | 6/1996 | Okuda et al. ............... 475/249 |
| 5,839,985 A | | 11/1998 | Teraoka |
| 5,957,801 A | | 9/1999 | Barnes, II |

FOREIGN PATENT DOCUMENTS

| | | | |
|---|---|---|---|
| EP | 0 130 806 B1 | 6/1984 | |
| EP | 0356401 | * 2/1990 | ................. 475/249 |

* cited by examiner

*Primary Examiner*—Charles A Marmor
*Assistant Examiner*—Ha Ho
(74) *Attorney, Agent, or Firm*—Knobbe, Martens, Olson & Bear, LLP

(57) ABSTRACT

A differential gear system for a vehicle includes a casing having two sun gears connected to half shafts for the vehicle's wheels, and two sets of planetary differential pinions surrounding the sun gears. Each set of differential pinions is in meshing engagement with one of the sun gears, and the two sets are also in meshing engagement with one another. Each pinion of one set is engaged with two adjacent pinioins of the other set, all of the pinions collectively arranged in a circle surrounding the axis of the sun gears. Each pinion is enclosed in a pocket in the casing, the pockets intersecting to allow engagement of the pinions with one another. Each pocket also encloses a pressure pad, a spring, and a pressure washer on the axial outer end of the enclosed pinion. The springs bias the pressure pads against the pinions to provide frictional resistance against differential action. For each pocket, a set screw is provided in an axial threaded bore of the casing, the end of the set screw bearing upon the pressure washer. Adjustment of the set screws permits fine tuning of the system's frictional resistance to differential action.

22 Claims, 5 Drawing Sheets

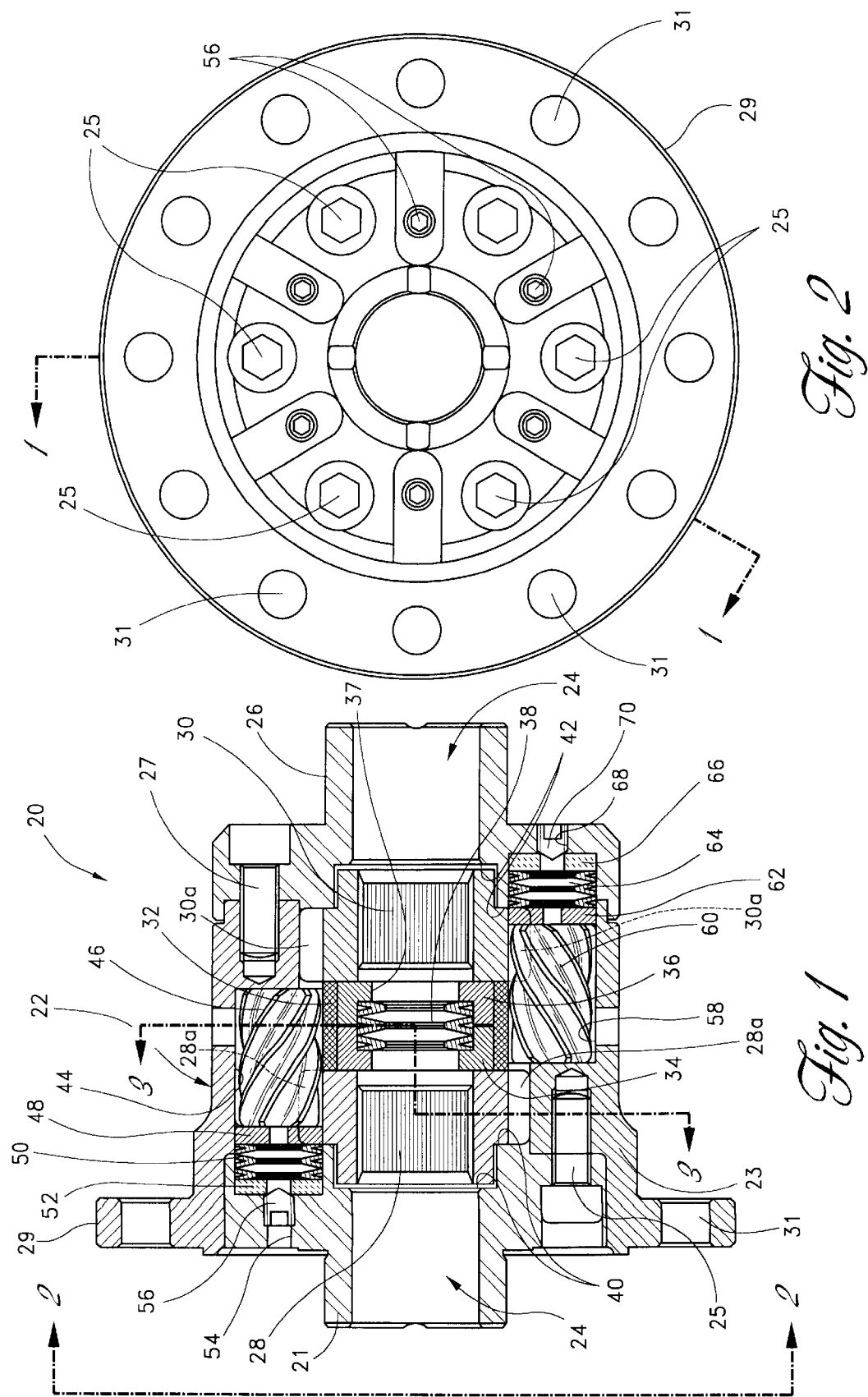

GEAR SYSTEM WITH ADJUSTABLE RESISTANCE TO DIFFERENTIAL ACTION

BACKGROUND OF THE INVENTION

1. Field of the Invention

The present invention relates generally to differential gear systems used in vehicles and, specifically, to a differential gear system providing adjustable resistance to differential action.

2. Description of the Related Art

As is well known to those skilled in the art, when a vehicle turns a corner, the driven road wheels of the vehicle rotate at different speeds, as the wheel on the inside of the curve travels a shorter distance than the wheel on the outside of the curve. For this reason, the drive shaft from the vehicle engine cannot be coupled directly to a continuous axle that carries the driven road wheels. Instead, the drive shaft must be coupled to a differential gear mechanism that drives two separate half shafts. Each half shaft carries a respective wheel. In this manner the wheels can be driven at different speeds of rotation.

In a vehicle having a conventional differential gear system, the vehicle drive shaft, which forms a connection from the gearbox or transmission case, has a bevel pinion that engages a larger bevel gear wheel called a crown wheel. The crown wheel is secured to a differential casing in which differential pinions are mounted. The differential pinions are rotatably mounted in the casing. When the casing rotates due to rotation of the crown wheel to which it is secured, the differential pinions revolve around the wheels' axis as they are carried by the rotating casing.

When the vehicle is traveling straight ahead, the casing rotates, but the differential pinions do not spin about their individual longitudinal axes. These pinions are engaged with bevel gears that are rigidly connected to the inner ends of the half shafts so that the latter rotate at the same speed. When the vehicle goes around a corner, one half shaft rotates at a slower speed than the other, causing the differential pinions to spin about their respective axes in the casing. The action of the differential pinions retards rotation of the bevel wheel of one half shaft and at the same time accelerates the bevel wheel of the other half shaft.

A disadvantage of such conventional differential mechanisms is that they permit one of the driven wheels to spin excessively if that wheel has less tractive ability than the other wheel, such as occurs under conditions of ice or mud. The total tractive ability of the vehicle is then limited to only one wheel. As the slipping wheel overspins, the differential pinions reactively spin and consequently reduce the torque supplied to the non-slipping wheel.

Several differential mechanisms have been proposed to overcome this disadvantage. One particularly useful design is illustrated and described in European Patent Application No. 84304420.7 to Quaife. This differential gear system includes a casing in which two collinear sun gears are journaled, the casing configured to rotate about the axis of rotation of the vehicle's wheels. Each sun gear has a splined connection to one of the half shafts that are connected to the wheels, such that rotation of a wheel causes likewise rotation of its respective sun gear. Two sets of planetary differential pinions are journaled in cylindrical pockets in the casing, the pockets being parallel to the axis of rotation of the wheels. Each set of pinions is engaged with one of the sun gears, such that the pinions surround the sun gear. Also, each pinion of one set is adjacent to and engaged with two pinions of the other set, such that as one set of pinions rotates in one direction, the other set of pinions rotates in the opposite direction. Collectively, the two sets of engaged differential pinions surround the axis of wheel rotation. The sun gears and the differential pinions have helical teeth. The casing includes end plates that enclose the pinions in the cylindrical packets of the casing. Each of the packets also encloses a thrust plate on the outer axial end of the enclosed differential pinion. The thrust plates are non-rotatably secured with respect to the casing.

This prior art differential mechanism operates as follows: When the vehicle is traveling straight ahead, the casing rotates. This causes the differential pinions to revolve about the half shafts. However, the pinions do not spin about their respective longitudinal axes. Since the differential pinions remain stationary with respect to the casing, the sun gears, which are engaged with the pinions, likewise do not rotate with respect to the casing. Thus, the sun gears, along with their respective half shafts and wheels, rotate at the same speed as the casing. In this manner, rotation of the casing causes rotation of the wheels. When the vehicle travels along a curve, the differential pinions rotate to slightly accelerate the speed of the wheel on the inside of the curve and to slightly decelerate the speed of the wheel on the outside of the curve.

When one wheel slips (for example, due to ice or mud on the road surface), the acceleration of the slipping wheel causes its respective sun gear to accelerate. The helical teeth of the sun gear mesh with the complementary helical teeth of the engaged set of differential pinions, causing the sun gear to be thrust axially inward and the differential pinions to be thrust axially outward against their respective thrust plates. The thrust plates apply a frictional force against the pinions that retards the spinning of the pinions and the slipping wheel. This frictional resistance to differential action prevents to some extent a reduction of torque to the non-slipping wheel.

SUMMARY OF THE INVENTION

It is a principal object and advantage of the present invention to provide a differential gear system in which frictional resistance to differential action can be adjusted to suit the particular needs of the driver and the driving conditions, as may be desired, for example, by racing enthusiasts. This is accomplished by the use of friction pads that are biased against the differential pinions by biasers, such as springs. Adjusters, such as set screws, may be included to permit adjustment of the biasing force of the biasers.

In one aspect, the present invention provides a differential gear mechanism comprising a casing, first and second sun gears, first and second sets of planetary pinions, a friction pad, and a spring. The first and second sun gears are rotatably mounted in the casing and are adapted to be connected to first and second half shafts, respectively, that are connected to road wheels of the vehicle. The first set of planetary pinions are journaled in a first set of pockets defined the casing, and are arranged to surround and mesh with the first sun gear. The second set of planetary pinions are journalled in a second set of pockets defined by the casing, and are arranged to surround and mesh with the second sun gear. The two sets of planetary pinions also mesh with one another. Each pocket for one set of pinions intersects two adjacent pockets for the other set of pinions, whereby each pinion of one set meshes with two adjacent pinions of the other set so that the planetary pinions of the first and second sets mesh with each other in a circle surrounding the sun gears. The friction pad is positioned on the axially facing outer end of at least one of the planetary pinions, and is biased against the planetary pinion by the spring. Additionally, a spring adjuster may be provided, the spring adjuster being configured to permit adjustment of the spring force applied by the spring onto the friction pad. The sun gears and planetary pinions have helical teeth.

In another aspect, the present invention provides a differential gear system for a vehicle, comprising a casing, first and second sun gears, first and second planetary pinions, first and second friction pads, and first and second springs. The casing is configured to rotate about a wheel axis of rotation of a pair of wheels of the vehicle. The first and second sun gears are rotatably mounted in the casing and are adapted to be connected to first and second half shafts, respectively, that are connected to road wheels of the vehicle. Both sun gears are configured to rotate generally about the wheel axis. The first and second planetary pinions are rotatably positioned in first and second pockets, respectively, defined by the casing. Each of the first and second pockets is distanced from the wheel axis so that the pocket revolves about the wheel axis when the casing rotates about the wheel axis. Each of the pinions is configured to spin within its respective pocket about a longitudinal axis of the pinion that is generally parallel to the wheel axis. The first pinion is in meshing engagement with the first sun gear, and the second pinion is in meshing engagement with the second sun gear. Also, the first and second pinions are in meshing engagement with each other. The first friction pad is positioned within the first pocket on the axially facing outer end of the first pinion. The first spring is adapted to bias the first friction pad against the first pinion. Similarly, the second friction pad is positioned within the second pocket on the axially facing outer end of the second pinion. The second spring is adapted to bias the second friction pad against the second pinion. Additionally, first and second spring adjusters may be provided. The first spring adjuster is configured to permit adjustment of the first spring to vary the force applied by the first spring against the first friction pad. Similarly, the second spring adjuster is configured to permit adjustment of the second spring to vary the force applied by the second spring against the second friction pad.

In yet another aspect, the present invention provides a differential mechanism, comprising a casing, first and second sun gears, first and second sets of planetary pinions, first and second sets of friction pads, and first and second sets of biasers. The first and second sun gears are rotatably mounted in the casing, and are configured to be non-rotatably connected to half shafts of first and second road wheels, respectively, of the vehicle. The first set of planetary pinions is in meshing engagement with the first sun gear, and the second set of planetary pinions is in meshing engagement with the second sun gear. Also, the first and second pinions are in meshing engagement with one another. The first set of friction pads is configured to retard spinning of the first set of pinions, and the second set of friction pads is configured to retard spinning of the second set of pinions. The first set of biasers is configured to bias the first set of friction pads against the first set of pinions. Similarly, the second set of biasers is configured to bias the second set of friction pads against the second set of pinions. Additionally, first and second sets of adjusters may be provided. The first set of adjusters is configured to permit adjustment of the biasing force of the first set of biasers against the first set of friction pads. Similarly, the second set of adjusters is configured to permit adjustment of the biasing force of the second set of biasers against the second set of friction pads.

In accordance with one embodiment, a differential gear mechanism comprises a casing, a first sun gear rotatably mounted in the casing and adapted to be connected to a first half shaft connected to a road wheel, and a second sun gear rotatably mounted in the casing and adapted to be connected to a second half shaft connected to a road wheel. The mechanism further comprises a first set of planetary pinions arranged to surround and to be in meshing engagement with the first sun gear. The first set of planetary pinions is journalled in a first set of pockets defined by the casing. The mechanism further comprises a second set of planetary pinions arranged to surround and to be in meshing engagement with the second sun gear. The second set of planetary pinions is journalled in a second set of pockets defined by the casing, and the second set of planetary pinions is in meshing engagement with the first set of planetary pinions. Each pocket for one of the first and second sets of pinions intersects two adjacent pockets for the other of the first and second sets of pinions, whereby each pinion of one of the sets meshes with two adjacent pinions of the other of the sets so that the planetary pinions of the first and second sets mesh with each other and surround the sun gears. The mechanism further comprises a friction pad on the axially facing outer end of at least one of the planetary pinions. The friction pad is biased against the planetary pinion by a spring. The sun gears and planetary pinions have helical teeth. The mechanism further comprises a spring adjuster configured to permit adjustment of the spring force applied by the spring onto the friction pad, to change the amount of force between the friction pad and the planetary pinion that the friction pad is biased against. The spring adjuster is accessible externally of the casing, and may be manipulated without need to disassemble the casing.

In accordance with another embodiment, a differential gear system for a vehicle comprises a casing configured to rotate about a wheel axis of rotation of a pair of road wheels of a vehicle, a first sun gear rotatably mounted in the casing and adapted to be connected to a first half shaft connected to a first of the wheels, the first sun gear configured to rotate generally about the wheel axis, and a second sun gear rotatably mounted in the casing and adapted to be connected to a second half shaft connected to a second of the wheels, the second sun gear configured to rotate generally about the wheel axis. The mechanism further comprises a first planetary pinion rotatably positioned in a first pocket defined by the casing. The first pocket is distanced from the wheel axis so that the first pocket revolves about the wheel axis when the casing rotates about the wheel axis. The first planetary pinion is configured to spin within the first pocket about a longitudinal axis of the first planetary pinion that is generally parallel to the wheel axis. The first planetary pinion is in meshing engagement with at least the first sun gear. The mechanism further comprises a second planetary pinion rotatably positioned in a second pocket defined by the casing. The second pocket is distanced from the wheel axis so that the second pocket revolves about the wheel axis when the casing rotates about the wheel axis. The second planetary pinion is configured to spin within the second pocket about a longitudinal axis of the second planetary pinion that is generally parallel to the wheel axis. The second planetary pinion is in meshing engagement with at least the second sun gear. The mechanism further comprises a first friction pad positioned within the first pocket on the axially facing outer end of the first planetary pinion, and a first spring adapted to bias the first friction pad against the first planetary pinion. The mechanism further comprises a second friction pad positioned within the second pocket on the axially facing outer end of the second planetary pinion, and a second spring adapted to bias the second friction pad against the second planetary pinion. The mechanism further comprises a first spring adjuster configured to permit adjustment of the first spring to vary the force applied by the first spring against the first friction pad, to change the force between the first planetary pinion and the first friction pad, and a second spring adjuster configured to permit adjustment of the second spring to vary the force applied by the second spring against the second friction pad, to change the force between the second planetary pinion and the second friction pad. At least one of the first spring adjuster and the second spring adjuster is accessible externally of the casing, and may be manipulated without need to disassemble the casing.

In accordance with another embodiment, a differential mechanism comprises a casing, a first sun gear rotatably mounted in the casing, the first sun gear configured to be non-rotatably connected to a half shaft connected to a first road wheel, and a second sun gear rotatably mounted in the casing, the second sun gear configured to be non-rotatably connected to a half shaft connected to a second road wheel. The mechanism further comprises a first set of planetary pinions in meshing engagement with the first sun gear, and a second set of planetary pinions in meshing engagement with the second sun gear and with the first set of pinions. The mechanism further comprises a first set of friction pads configured to retard spinning of the first set of pinions, a second set of friction pads configured to retard spinning of the second set of pinions, a first set of biasers configured to bias the first set of friction pads against the first set of pinions, and a second set of biasers configured to bias the second set of friction pads against the second set of pinions. The mechanism further comprises a first set of adjusters configured to permit adjustment of the biasing force of the first set of biasers against the first set of friction pads, to change the amount of force between the first set of friction pads and the first set of pinions. At least one of the first set of adjusters is accessible externally of the casing, and may be manipulated without need to disassemble the casing.

In accordance with another embodiment, there is disclosed a method of resisting differential action of a differential gear mechanism of a vehicle, wherein the mechanism comprises a casing, first and second sun gears positioned within the casing and configured to be connected to half shafts connected to road wheels of the vehicle, a first planetary pinion in meshing engagement with the first sun gear, a second planetary pinion in meshing engagement with the second sun gear and with the first planetary pinion, and a friction pad bearing against the first planetary pinion. The method comprises applying a spring force against the friction pad to bias the friction pad against the first planetary pinion, and adjusting the spring force by varying the position of a spring adjuster while maintaining the casing in an assembled state.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 1 is a sectional view of a differential mechanism accord to one embodiment of the present invention, taken along lines 1—1 of FIG. 2;

FIG. 2 is a front view of the differential mechanism of FIG. 1;

DETAILED DESCRIPTION OF THE PREFERRED EMBODIMENT

The preferred embodiment of the present invention includes improvements to the differential gear system shown and described in European Patent Application No. 84304420.7 to Quaife, which is hereby incorporated herein by reference, in its entirety. However, those of ordinary skill in the art will understand that the inventive teachings described herein can be applied to a wide variety of designs for differential gear systems. The scope of the present invention is not limited to improvements to the design shown and described in the above-referenced patent application.

Figure 3:
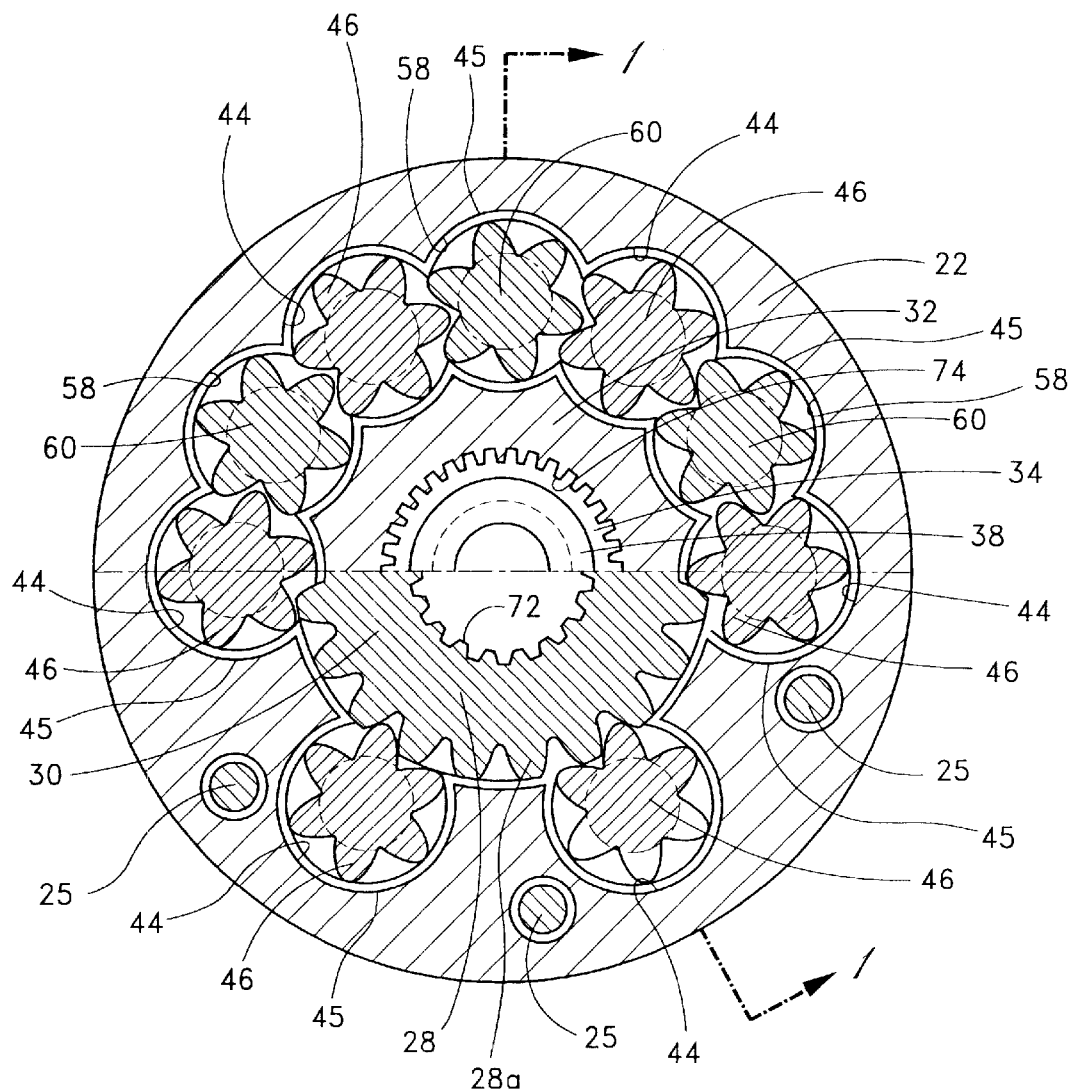
FIG. 3 is a sectional view of the differential mechanism of FIG. 1, taken along lines 3—3 thereof.

FIGS. 1–3 illustrate a differential gear system 20 of a vehicle, according to a preferred embodiment of the present invention. As described herein, the gear system 20 includes a casing 22 comprising an inset portion 21, a body 23, and an end piece 26 rigidly attached together by bolts 25 and 27. The body 23 forms a crown wheel flange 29 with a number of holes 31 to facilitate attachment of the vehicle's crown wheel (not shown) to the flange 29. In the illustrated embodiment, six bolts 25 extend through recessed holes in the inset portion 21 into threaded bores in an axial end of the body 23. The bolts 25 secure the inset portion 21 to the body 23. Similarly, six bolts 27 extend through recessed holes in the end piece 26 into threaded bores in the other axial end of the body 23. The bolts 27 secure the end piece 26 to the body 23.

The casing 22 has a central cylindrical channel 24, which is formed by aligned bores in, and the inner surfaces or walls of, each of the inset portion 21, the body 23, and the end piece 26. Each end of the channel 24 is configured to receive a half shaft to which a wheel of the vehicle is attached. The half shafts are attached to sun gears 28 and 30 in a rotationally fixed manner, so that the sun gears and the half shafts rotate at the same speed. Preferably, the sun gears have a splined interior surface 72 (FIG. 3) that mates with a complementary splined exterior surface of the half shafts. The sun gears 28 and 30 are rotatably mounted in the channel 24, so that the sun gears and the half shafts are rotatable with respect to the casing 22. In the illustrated embodiment, the sun gear 28 includes outer helical teeth 28a each of which defines a right-hand helix as viewed from the outer axial end of the sun gear 28. The sun gear 30 has outer helical teeth 30a each of which defines a left-hand helix as viewed from the same reference point.

The sun gears 28 and 30 are separated by an assembly comprising a rigid cylindrical block 32 enclosing friction or thrust pads 34 and 36. The block 32 is preferably non-rotatably secured to the casing 22, for example by a splined connection with the channel 24. Alternatively, the block 32 may be formed integrally with the body 23. In this case, the thrust pads preferably have a splined interface 74 (FIG. 3) with the block 32. Each thrust pad 34, 36 includes an internal annular ridge 37 on its inner axial side such that the two ridges form a recess for receiving a spring pack 38. The spring pack 38 may comprise, for example, Belleville type disc springs or a coil spring. The spring pack 38 biases the thrust pads 34 and 36 axially outward against the sun gears 28 and 30, respectively. The sun gear 28 is maintained within the casing 22 by annular ridges 40 of the inset portion 21. The sun gear 30 is maintained in place by annular ridges 42 of the end piece 26.

In the illustrated embodiment, the casing 22 includes a first set of six elongated cylindrical pockets 44 defined by pocket walls 45 formed in the casing 22. The pockets 44 are arranged in a circle around the axis of rotation of the casing, the sun gears 28 and 30, and the half shafts. The pockets 44 are formed by aligned axial bores in the inset portion 21 and the body 23. In other embodiments, the pockets 44 (and the pockets 58 described below) may have non-cylindrical shapes. Each pocket 44 is sized and adapted to enclose a planetary differential pinion 46 journaled therein, such that a first set of six planetary differential pinions 46 is provided. The differential pinions 46 include helical teeth each of which defines a left-hand helix as viewed from the outer axial end of the sun gear 28. The differential pinions 46 are in meshing engagement with the sun gear 28. Each pocket 44 also encloses a friction pad or "pressure pad" 48, a spring 50, and a pressure washer 52. The pad 48 is positioned adjacent to the axial outer end of the differential pinion 46. The spring 50 bears against and biases the pad 48 against the differential pinion 46. The spring 50 may comprise a coil spring or Belleville type disc springs. The washer 52 resides between the spring 50 and the outer axial end of the pocket 44. Preferably, the friction pad 48, the spring 50, and the pressure washer 52 are non-rotatably secured with respect to the casing 22, such as by a splined connection therebetween, as illustrated in connection with thrust pads 34, 36.

For one or more of the springs 50, there is preferably provided a spring adjuster that permits adjustment of the spring force that the spring 50 applies onto the friction pad 48. In the illustrated embodiment, each pocket 44 has an associated threaded axial bore 54 extending from the outer end of the casing 22 to the pocket 44. The bore 54 includes a set screw 56 threadingly engaged therein. The set screw 56 bears against the pressure washer 52. Adjustment of the set screw 56 varies the axial position of the washer 52. This permits adjustment of the compression of the spring 50 to vary the friction force applied by the friction pad 48 against the differential pinion 46 during spinning of the pinion 46.

The casing 22 also includes a second set of six elongated cylindrical pockets 58 defined by pocket walls 45 formed in the casing 22. The pockets 58 are arranged in a circle around the axis of rotation of the casing, the sun gears 28 and 30, and the half shafts. The pockets 58 are formed by aligned axial bores in the end piece 26 and the body 23. The pockets 58 enclose a second set of planetary differential pinions 60 that have helical teeth in a right-hand helix, as viewed from the outer axial end of the sun gear 28. The differential pinions 60 are in meshing engagement with the sun gear 30. Also, as best seen in FIG. 3, each pocket 58 intersects two pockets 44, and vice-versa. Each differential pinion 60 is in meshing engagement with two differential pinions 46, and vice-versa. Thus, as well known in the art, as one set of differential pinions rotates in a first direction, the other set of differential pinions rotates in the opposite direction.

Each pocket 58 includes a friction or pressure pad 62, a spring 64, and a pressure washer 66 that are configured and arranged similarly to the pads 48, springs 50, and washers 52 described above in connection with the first set of pockets 44. Preferably, one or more spring adjusters are provided to permit adjustment of the spring force of at least one of the springs 50, which is applied to the friction pads 62. In the illustrated embodiment, the end piece 26 includes a threaded axial bore 68 and a set screw 70 for each pocket 58. Adjustment of the set screw 70 moves the pressure washer 66 axially inward or outward, to vary the compression of the spring 64. This permits adjustment of the friction force applied by the friction pad 62 against the differential pinion 60 when the pinion spins within its associated pocket 58. Preferably, the friction pad 62, the spring 64, and the pressure washer 66 are non-rotatably secured with respect to the casing 22, such as by a splined connection therebetween.

In operation, a vehicle delivers power to each pair of wheels through the vehicle's differential gear system. The differential gear system divides the vehicle's power between the wheels to suit the driving conditions. Consider a vehicle having a differential gear system 20 as described above for a pair of wheels. The vehicle drive shaft transmits torque to the casing 22, causing the casing to rotate about the wheels' axis of rotation. This causes the differential pinions 46 and 60 to revolve around the same axis. Since the differential pinions 46 and 60 are in meshing engagement with the sun gears 28 and 30, the circular movement of the differential pinions causes the sun gears to rotate, along with the half shafts and wheels.

When the vehicle is traveling straight ahead without loss of traction, the vehicle's wheels rotate at equal speeds. In this condition, the vehicle's power is split equally between the two wheels. The differential pinions 46 and 60 revolve about the sun gears 28 and 30 but do not spin about their individual axes. Thus, the sun gears 28 and 30 each rotate at the same speed as the casing 22.

In contrast, when the vehicle is driving along a curve, the wheels rotate at different speeds. The wheel on the inside of the curve ("the inner wheel") rotates at a slightly lower speed than the wheel on the outside of the curve ("the outer wheel"). The vehicle's power unevenly split between the wheels. More power is transmitted to the outer wheel than to the inner wheel. For example, suppose that the inner wheel is the wheel connected to the sun gear 28, and that the outer wheel is the wheel connected to the sun gear 30. The differential pinions 46, which are in meshing engagement with the sun gear 28, spin in the direction of wheel rotation. Accordingly, the sun gear 28 (and the inner wheel) decelerates. The differential pinions 60, which are in meshing engagement with the differential pinions 46 and with the sun gear 30, spin oppositely to the direction of wheel rotation. As a result, the sun gear 30 (and the outer wheel) accelerates. The speed at which the differential pinions rotate depends upon the curvature of the vehicle's drive path.

When one of the vehicle's wheels loses traction, as may occur when the wheel is on an icy patch or in mud, the differential gear system 20 minimizes the reduction of power to the opposite, non-slipping wheel. Suppose, for example, that the wheel connected to the sun gear 28 loses traction. The wheel tends to slip, i.e., increase its speed of rotation. As a result, the sun gear 28 tends to accelerate to a speed above that at which the sun gear 30 rotates. This causes the differential pinions 46 and 60 to begin rotating. In particular, the differential pinions 46 begin to rotate oppositely to the direction of wheel rotation, and the differential pinions 60 begin to rotate in the direction of wheel rotation. Since the sun gear 28 and the differential pinions 46 have helical teeth, the relative rotation of such gears causes them to impart an axial force against each another. In other words, the sun gear 28 imparts an axial force against the differential pinions 46, and the pinions 46 impart a reactive force against the sun gear 28. Due to the right-handed helical teeth of the sun gear 28 and the left-handed helical teeth of the differential pinions 46, the sun gear 28 is thrust axially inward against the thrust pad 34 and the pinions 46 are thrust axially outward against the friction pads 48. The contact of the gears 28 and 46 with the pads 34 and 48, respectively, creates a frictional force that retards the rotation of the gears. Advantageously, the frictional force substantially impedes differential action. This substantially prevents any retardation of the rotation of the sun gear 30, thereby minimizing any reduction of torque transmitted to the non-slipping wheel.

The operation is similar for the case in which the wheel connected to the sun gear 30 loses traction. In that case, the acceleration of the slipping wheel causes the sun gear 30 to be thrust axially inward against the thrust pad 36 while the differential pinions 60 are thrust axially outward against the friction pads 62. The pads 36 and 62 retard the differential action, thus minimizing any reduction of torque transmitted to the non-slipping wheel that is connected to the sun gear 28.

The spring adjusters permit adjustment of the friction force applied by the pressure pads 48 and 62 against the differential pinions 46 and 60, respectively. In the illustrated embodiment, the set screws 56 and 70 may be adjusted, i.e., moved axially, to provide substantial control over the frictional effect of the pads 48 and 62. Further, since there are 12 total set screws 56 and 70, the total frictional resistance to differential action can be very finely tuned to suit the needs of the driver. Preferably, the spring adjusters are removable from the casing 22, to readily permit replacement of the spring adjusters with adjusters of different sizes (e.g., lengths) for further control of the overall frictional force between the pads 48, 62 and the pinions 46, 60. It will be appreciated that longer set screws 56 and 70 will permit the application of relatively greater friction force between the pads and the pinions.

In one extreme, the set screws 56 and 70 are all completely retracted from the pressure washers 52 and 66, respectively, so that the frictional resistance to differential action is minimized. In this condition, the differential gear system 20 acts more like a conventional differential mechanism. This condition may be preferred for driving conditions that involve a dry road and lots of turns. In another extreme, the set screws 56 and 70 are all advanced as far as possible against the pressure washers 52 and 66, respectively, so that the frictional resistance to differential action is maximized. In this condition, the differential gear system 20 resists slippage of one wheel relative to the other. This condition may be preferred for driving conditions that involve a wet, icy, or muddy road and few turns. The set screws can be adjusted to provide any frictional resistance between these two extremes, with a high degree of fine-tuning capability. Those of ordinary skill in the art will readily appreciate from the teachings herein that the springs 38, 50, and 64 can be selected to have various different compression and force characteristics, to achieve the desired frictional resistance to differential action. Thus, as an alternative or supplement to the use of set screws to adjust the spring force, the springs themselves may be replaced as desired with springs having a different spring rate, to achieve the necessary fine tuning of differential performance.

Figure 4:
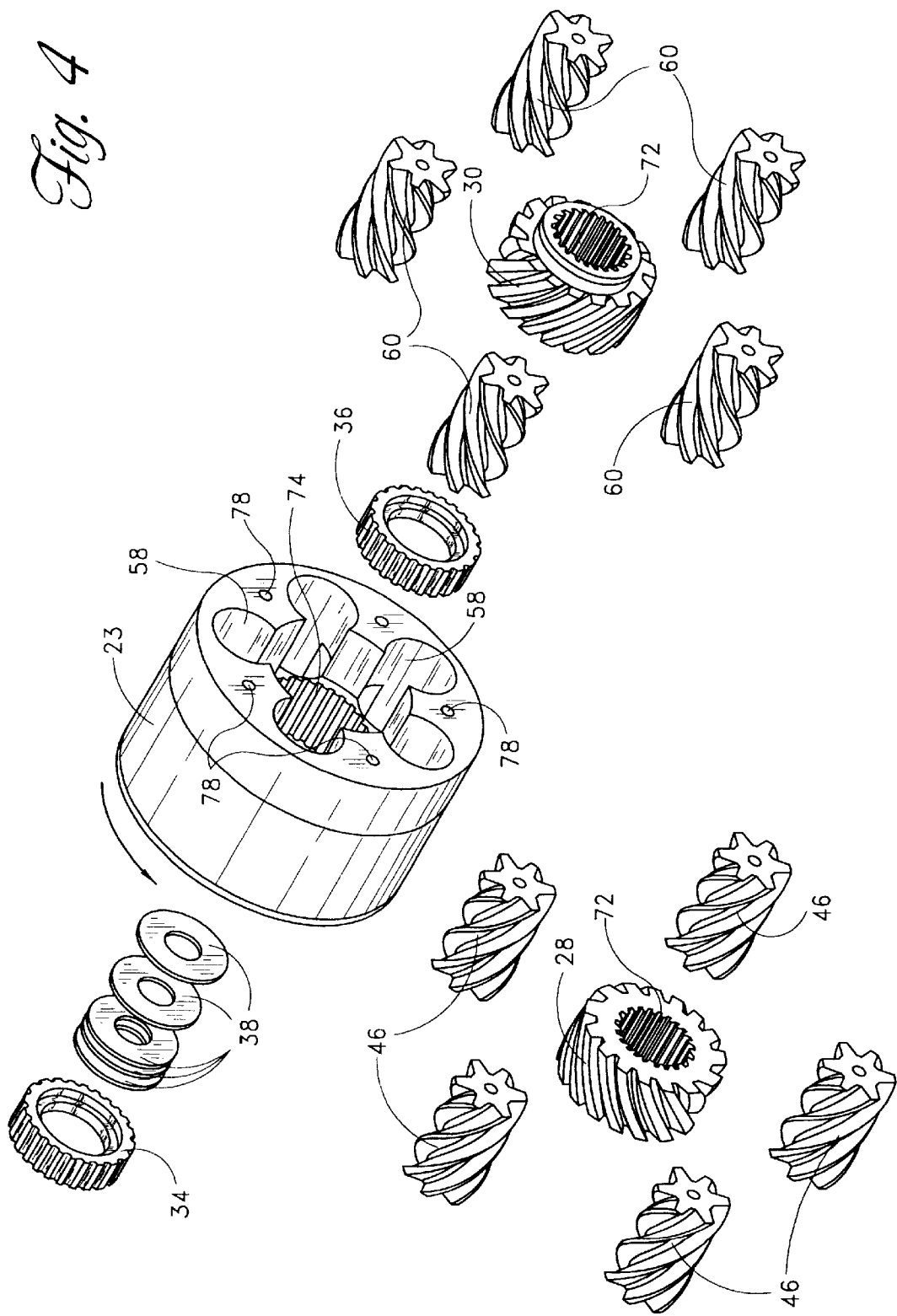
FIG. 4 is a perspective view of a disassembled differential mechanism according to another embodiment of the present invention.
Figure 5:
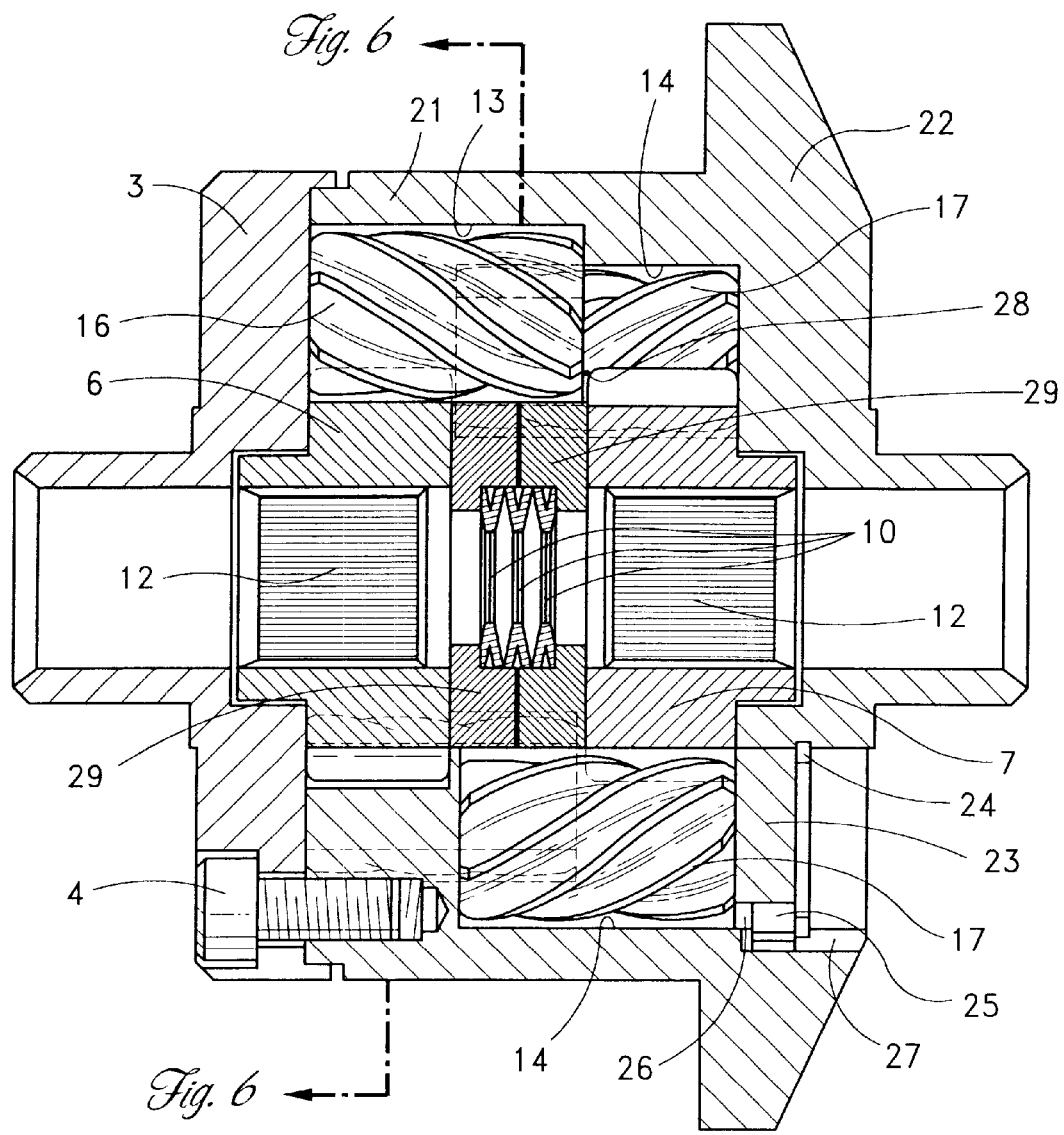
FIGS. 5 and 6 are, respectively, side and end sectional views of the differential mechanism of FIG. 4.
Figure 6:
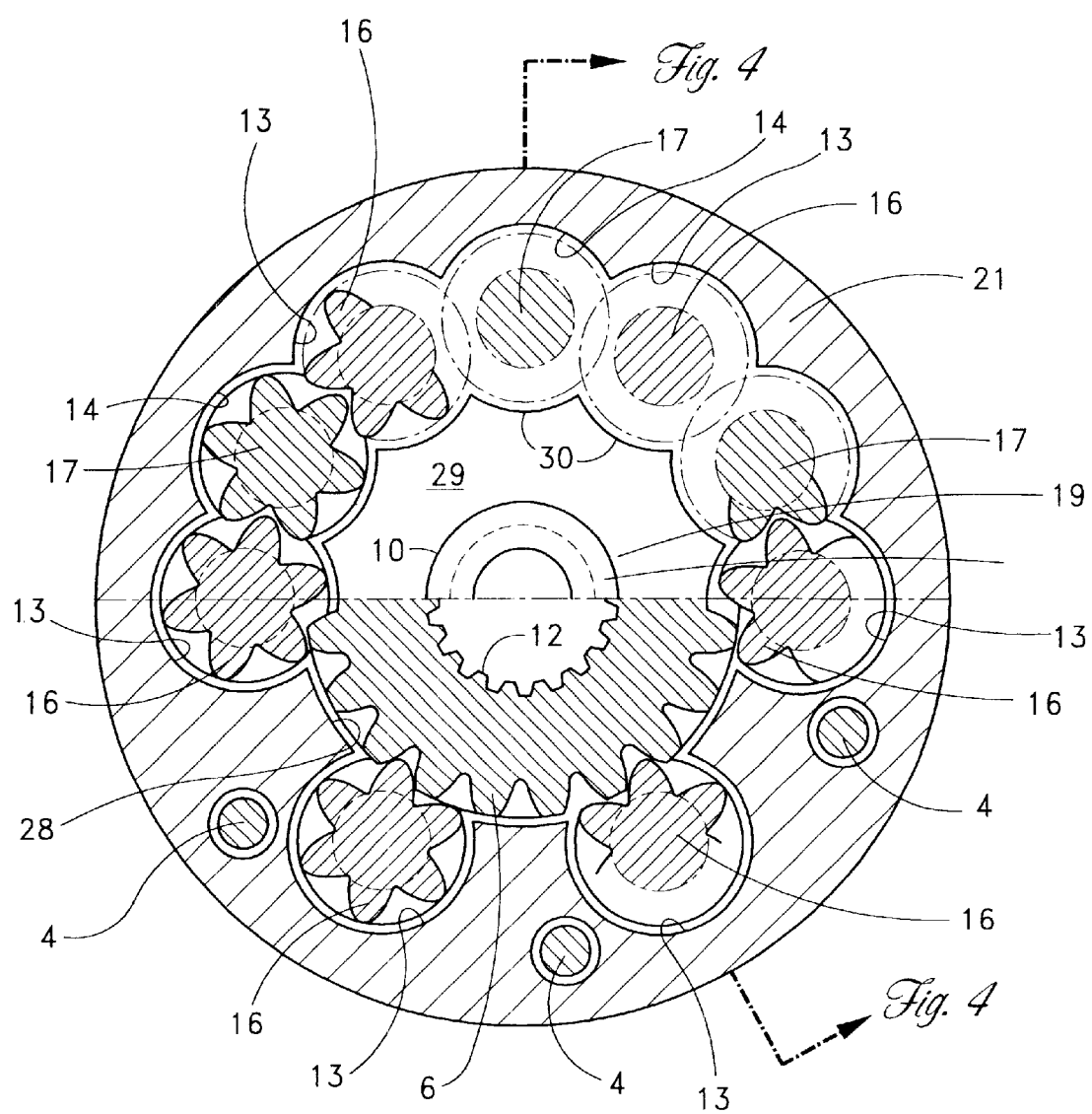

FIG. 4 illustrates a differential gear system according to another embodiment of the invention, in a disassembled form. This embodiment is similar to that disclosed above with the exception that there are five differential pinions in each set. The pressure pads 48 and 62, the springs 50 and 64, the pressure washers 52 and 66, and the set screws 56 and 70 are not shown in FIG. 4. This differential gear system includes ten sets of pressure pads, springs, pressure washers, and set screws ("friction sets") for the differential pinions, one for each pinion. Thus, this embodiment permits slightly less fine-tuning capability compared to the embodiment of FIGS. 1–3, but is simpler and less expensive to manufacture. Those of ordinary skill in the art will understand from the teachings herein that any number of differential pinions and friction sets can be provided.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above, but should be determined only by a fair reading of the claims that follow.

What is claimed is:

1. A differential gear mechanism comprising:
   a casing;
   a first sun gear rotatably mounted in said casing and adapted to be connected to a first half shaft connected to a road wheel;
   a second sun gear rotatably mounted in said casing and adapted to be connected to a second half shaft connected to a road wheel;
   a first set of planetary pinions arranged to surround and to be in meshing engagement with said first sun gear, said first set of planetary pinions being journalled in a first set of pockets defined by said casing;
   a second set of planetary pinions arranged to surround and to be in meshing engagement with said second sun gear, said second set of planetary pinions being journalled in a second set of pockets defined by said casing, said second set of planetary pinions being in meshing engagement with said first set of planetary pinions, each pocket for one of said first and second sets of pinions intersecting two adjacent pockets for the other of said first and second sets of pinions, whereby each pinion of one of said sets meshes with two adjacent pinions of the other of said sets so that the planetary pinions of said first and second sets mesh with each other and surround the sun gears; and
   a planetary friction pad on the axially facing outer end of at least one of said planetary pinions, said planetary friction pad being biased against said planetary pinion by a spring;
   wherein the sun gears and planetary pinions have helical teeth;
   further comprising a spring adjuster configured to permit adjustment of the spring force applied by said spring onto said planetary friction pad, to change the amount of force between said planetary friction pad and the planetary pinion that said planetary friction pad is biased against;
   wherein said spring adjuster is accessible externally of said casing, and may be manipulated without need to disassemble said casing;
   further comprising sun fiction pads biased against the axially facing inner ends of said sun gears.

2. The differential gear mechanism of claim 1, wherein said spring force is adjusted by axial movement of said spring adjuster.

3. The differential gear mechanism of claim 1, wherein said spring adjuster is removable from said differential gear mechanism.

4. The differential gear mechanism of claim 1, wherein said spring adjuster comprises a set screw.

5. The differential gear mechanism of claim 1, further comprising a washer positioned between said spring and said spring adjuster.

6. The differential gear mechanism of claim 1, wherein said spring and said planetary friction pad are provided within one of said pockets.

7. The differential gear mechanism of claim 1, wherein said planetary friction pad is non-rotatably fixed with respect to said casing.

8. The differential gear mechanism of claim 1, further comprising a plurality of planetary friction pads on the axially facing outer ends of said planetary pinions, said planetary friction pads being biased against said planetary pinions by springs.

9. The differential gear mechanism of claim 8, further comprising spring adjusters configured to permit adjustment of the spring forces applied by said springs onto said planetary friction pads.

10. A differential mechanism, comprising:

a casing;

a first sun gear rotatably mounted in said casing, said first sun gear configured to be non-rotatably connected to a half shaft connected to a first road wheel;

a second sun gear rotatably mounted in said casing, said second sun gear configured to be non-rotatably connected to a half shaft connected to a second road wheel;

a first set of planetary pinions in meshing engagement with said first sun gear;

a second set of planetary pinions in meshing engagement with said second sun gear and with said first set of pinions;

a first set of friction pads configured to retard spinning of said first set of pinions;

a second set of friction pads configured to retard spinning of said second set of pinions;

a first set of biasers configured to bias said first set of friction pads against said first set of pinions;

a second set of biasers configured to bias said second set of friction pads against said second set of pinions; and a first set of adjusters configured to permit adjustment of the biasing force of said first set of biasers against said first set of friction pads, to change the amount of force between said first set of friction pads and said first set of pinions;

wherein at least one of said first set of adjusters is accessible externally of said casing, and may be manipulated without need to disassemble said casing;

wherein said biasers and said friction pads are non-rotatable with respect to said casing.

11. The differential mechanism of claim 10, further comprising:

a second set of adjusters configured to permit adjustment of the biasing force of said second set of biasers against said second set of friction pads; to change the amount of force between said second set of friction pads and said second set of pinions;

wherein at least one of said second set of adjusters is accessible externally of said casing, and may be manipulated without need to disassemble said casing.

12. The differential mechanism of claim 11, wherein said adjusters comprise set screws threadingly engaged with said casing.

13. The differential mechanism of claim 11, further comprising washers positioned between said set screws and said biasers.

14. The differential mechanism of claim 13, wherein said biasers comprise springs.

15. The differential mechanism of claim 10, wherein said biasers comprise springs.

16. The differential mechanism of claim 10, wherein said pinions and said sun gears have helical teeth that cause said first set of pinions to be thrust into said first set of friction pads when the first wheel overspins, and that cause said second set of pinions to be thrust into said second set of friction pads when the second wheel overspins.

17. A differential mechanism, comprising:

a casing;

a first sun gear rotatably mounted in said casing, said first sun gear configured to be non-rotatably connected to a half shaft connected to a first road wheel;

a second sun gear rotatably mounted in said casing, said second sun gear configured to be non-rotatably connected to a half shaft connected to a second road wheel;

a first set of planetary pinions in meshing engagement with said first sun gear;

a second set of planetary pinions in meshing engagement with said second sun gear and with said first set of pinions;

a first set of friction pads configured to retard spinning of said first set of pinions;

a second set of friction pads configured to retard spinning of said second set of pinions;

a first set of biasers configured to bias said first set of friction pads against said first set of pinions; and a second set of biasers configured to bias said second set of friction pads against said second set of pinions;

wherein said biasers and said friction pads are non-rotatable with respect to said casing.

18. The differential mechanism of claim 17, further comprising:

a first set of adjusters configured to permit adjustment of the biasing force of said first set of biasers against said first set of friction pads, to change the amount of force between said first set of friction pads and said first set of pinions; and a second set of adjusters configured to permit adjustment of the biasing force of said second set of biasers against said second set of friction pads, to change the amount of force between said second set of friction pads and said second set of pinions.

19. The differential mechanism of claim 18, wherein said first and second sets of adjusters are removable from said differential mechanism.

20. The differential mechanism of claim 18, wherein said adjusters comprise set screws threadingly engaged with said casing.

21. The differential mechanism of claim 20, further comprising washers positioned between said set screws and said biasers.

22. The differential mechanism of claim 18, wherein said biasers comprise springs.

* * * * *